Figure 1:
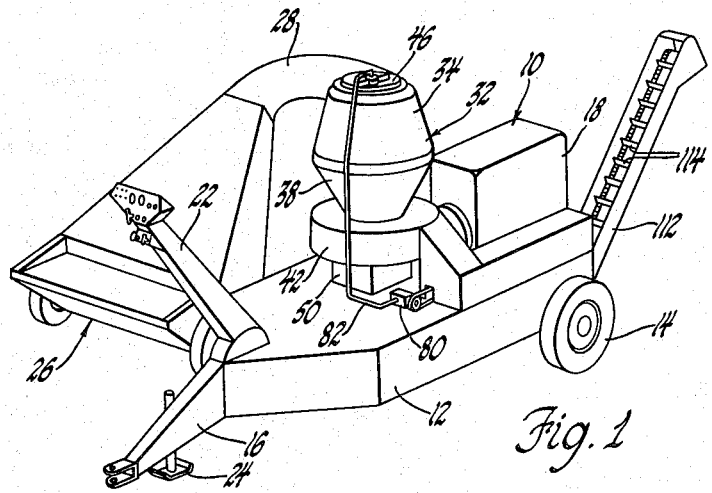

May 18, 1965     S. L. LAWRENCE     3,183,858

HAY WAFERING METHOD AND APPARATUS

Filed Aug. 23, 1962

INVENTOR.
Stanley L. Lawrence
BY
Barnard & McGlynn
ATTORNEYS 3,183,858
HAY WAFERING METHOD AND APPARATUS
Stanley L. Lawrence, Livonia, Mich., assignor to Massey-Ferguson Inc., Detroit, Mich., a corporation of Maryland
Filed Aug. 23, 1962, Ser. No. 218,965
16 Claims. (Cl. 107—14)

This invention relates to a method and apparatus for producing hay wafers and, in particular, to a method and apparatus for field wafering forage crops into hay wafers particularly characterized by an improved method and means for feeding the hay to be wafered to the wafering apparatus.

In recent times, apparatus has been devised for field wafering forage crops into hay wafers comprising an annular series of axially open die cells including entrance ends thereof circumferentially spaced about and communicating with a wafering chamber in which there is mounted a rotary hay compaction or compression means for compacting or compressing hay received within the wafering chamber into and through the die cells to form hay wafers. A rotatable multiple flight feed auger has been disposed within an enclosing hopper having one end thereof communicating with the aforementioned chamber. A pick-up mechanism, such as of the rotary flail type including a plurality of spaced rapidly rotatable flails or arms, has also been provided for picking up and delivering hay, preferably preconditioned or processed, finely chopped, mixed and blanded hay from a windrow within a field, to the aforementioned hopper for feed therefrom to the wafering chamber. As a result, as such an apparatus moves through a field of mown hay, the latter is continuously picked up and delivered to the aforementioned hopper from which it is fed by the multiple flight feed auger to the wafering chamber and the rotary hay compaction or compression means aforementioned to provide a continuous extrusion of compressed or compacted hay of substantially uniform quality, constituency, shape and density emerging from the exit ends of the respective die cells, and each extrusion is adapted to be engaged with an ejection means adjacent the exit end of each of the die cells to break the respective extrusions of hay into hay wafers of substantially uniform length, which then preferably fall upon a conveyor means for removal from the apparatus.

In an apparatus of the type aforementioned, the hay mixture picked up and delivered by the aforementioned pick-up mechanism is entrained in or accompanied by an air stream traveling at considerable velocity due to the action of the rapidly rotating flails or arms of the pick-up mechanism. It has been found that, if this air stream or at least a substantial portion thereof is not separated from the hay being delivered to the hopper, a back pressure will build up in the latter retarding to a substantial extent further continuous supply of hay thereto by the rotary flail pick-up mechanism or the like. As a consequence, relatively elaborate arrangements have been made heretofore to separate the air stream from the hay prior to its delivey to the hopper.

For example, means have been provided in connection with the delivery chute associated with a rotary flail type pick-up mechanism for separating the air stream from the hay propelled through the delivery chute and diverting or venting the air stream from the delivery chute. In other instances, often in combination with the venting arrangement aforementioned, various vent openings have been provided in other portions of the apparatus and even in a side wall of the hopper alongside the feed auger therein which, of course, is not too satisfactory since hay may be lost therethrough either while delivering hay to the hopper or during the feeding action therefrom under the influence of the feed auger, or both.

In addition, in prior apparatus of the type aforementioned, the delivery chute of the pick-up mechanism has been connected to the hopper to one side thereof and to one side of the axis of rotation of the multiple flight feed auger contained therein. Thus, the respective flights of the feed auger alternately or successively rotate into and through the area of the hopper receiving the hay and pick up the latter for feed to the wafering chamber. Hence, the delivered hay may be unequally distributed to the respective flights of the auger and, through the feeding action of the latter, unequally distributed to respective ones or groups of the annular series of die cells communicating with the wafering chamber. This is particularly true when, for one reason or another, hay is being delivered to the hopper at rates or in quantities less than that for which the apparatus was designed, resulting in a particular group, or in any event, less than all of the individual die cells of the annular series thereof being fed more hay from the auger and more wafers formed therefrom than from other die cells. As will be readily apparent, such a condition results in overworking certain ones of the die cells resulting in inordinate wear thereof and a decrease in the production rate of wafers and the overall efficiency of the apparatus.

The present invention contemplates an improved method and apparatus for making compressed hay wafers and of the general type aforementioned having an annular series of axially open die cells including entrance ends thereof circumferentially spaced about and communicating with a wafering chamber in which there is mounted a rotary hay compaction or compression means for compacting or compressing hay received within the wafering chamber into and through the respective die cells to form wafers, and which method and apparatus are particularly characterized by a hopper having one end thereof communicating with the aforementioned wafering chamber, feed auger means rotatably disposed within the hopper for feeding hay therefrom to the aforementioned wafering chamber, a vent duct mounted interiorly of the hopper in axially spaced relation to the feed auger means for venting the interior of the hopper, and means for delivering hay in an accompanying air stream into the hopper between the latter and the aforementioned duct, whereby the hay and accompanying air stream have imparted thereto an axially swirling action along the duct toward an open interior end thereof where the air is separated from the hay and vented to the exterior of the hopper.

More specifically in this regard, the hopper is particularly characterized in having a section tapering axially outwardly from the aforementioned duct which is disposed substantially coaxially therewithin to define therebetween an annular delivery area for hay and its accompanying air stream, which area gradually increases axially toward the feed auger means axially spaced from the duct, and a pick-up mechanism is provided for picking up and delivering hay to be wafered in an accompanying air stream through a delivery chute which discharges into a narrower portion of the delivery area so as to have imparted thereto an axially swirling motion along and around the duct and axially toward the feed auger means, the air losing some of its velocity as it moves into wider portions of the delivery area and ultimately being vented from the hopper through the duct while the hay passes axially downwardly in a swirling cyclonic flow path toward the feed auger means.

In another of its aspects, the invention is further characterized by the fact that the hay propelled from the pick-up mechanism through a delivery chute to the hopper as aforementioned swirls axially along the hopper toward one end of the feed auger means remote from the wafering chamber. As a consequence, the hay swirls axially along and radially about and onto the flights of the feed auger means resulting in a relatively uniform distribution of the hay thereon and irrespective of any variation in the rates or quantities of hay delivered to the hopper. In this regard, the invention is further characterized by the fact that the feed auger means includes a plurality of auger flights which are axially tapered outwardly from the one end thereof aforementioned receiving the hay from the delivery chute to the end thereof feeding the wafering chamber, whereby hay delivered axially thereto and passing a portion of an auger flight adjacent the receiving end thereof may fall upon another auger flight portion spaced therefrom toward the wafering chamber.

Figure 2:
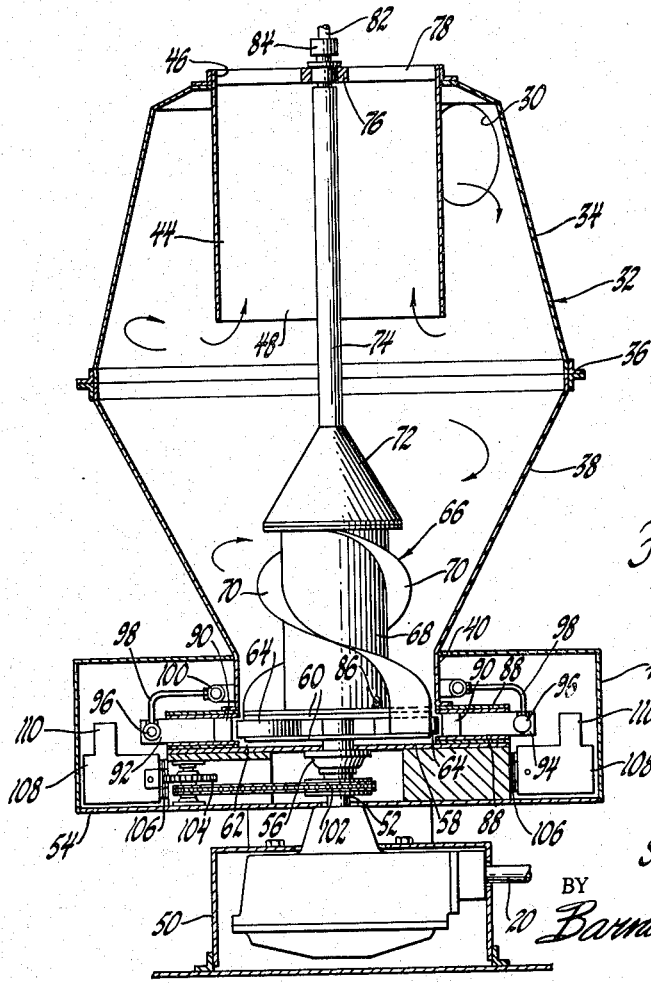

In order to facilitate an understanding of the invention, a preferred embodiment thereof will now be described with reference to the accompanying drawing in which:

FIGURE 1 is a perspective view of a hay wafering apparatus illustrating a preferred embodiment of the invention; and FIGURE 2 is an enlarged fragmentary vertical sectional view through the apparatus of FIGURE 1 illustrating certain details thereof.

Referring now to the drawing, the numeral 10 in FIGURE 1 generally indicates a hay wafering apparatus comprising a frame 12 equipped with the usual ground-engaging wheel means 14 in the usual manner and a drawbar 16 adapted to be hitched to a suitable prime mover, such as an agricultural tractor, for drawing the frame along a field of mown hay. A suitable engine 18 is mounted on the frame and includes an output shaft 20 connected in a manner to be described hereinafter to a rotary hay feeding and compaction or compression mechanism of the apparatus, as well as various other instrumentalities of the apparatus as desired. A control pedestal 22 is provided on the frame and mounts at the upper end thereof a control panel having instruments thereon for controlling the engine 18 and other instrumentalities of the apparatus. An adjustable foot 24 is provided as usual on the drawbar 16 to support the latter when the apparatus is not hitched to a towing prime mover.

The apparatus aforedescribed is adapted to be towed along a field of mown or cut hay, preferably with the hay arranged in windrows and having been preconditioned or processed in a known manner so as to consist of finely chopped, mixed and blended stem and leaf components forming a substantially homogeneous mass. As the apparatus is towed along the field, the hay in a given windrow is adapted to be picked up in a suitable pick-up mechanism preferably of the well known wheeled rotary flail type indicated generally at 26 and comprising a plurality of rapidly rotatable flails or arms which pick up and direct the homogenized hay in an accompanying air stream into the delivery chute 28, which delivers the hay and air stream to an opening 30 in the upper end of a vertically disposed hopper indicated generally at 32.

Referring now more particularly to FIGURE 2, it may be seen that the hopper 32 comprises an annular axially downwardly and outwardly tapered upper section 34 having its lower end suitably secured as indicated at 36 to the upper end of an axially downwardly and inwardly tapered section 38 terminating in a cylindrical wall portion 40 suitably secured within an annular housing 42 suitably supported on frame 12. A cylindrical axially extending vent duct 44 includes an opening upper end 46 suitably rigidly secured to the upper end of the upper section 34 of the hopper, and depends therefrom interiorly and substantially coaxially of the hopper toward its lower open end 48. The upper section of the hopper and the duct radially inwardly spaced therefrom define therebetween an annular delivery area for receiving the hay to be wafered and accompanying air stream entering the hopper through the opening 30, and it will be noted that the opening 30 is disposed in a relatively narrow portion of this delivery area adjacent the upper end of the upper section 34 of the hopper, the delivery area gradually increasing in cross section throughout the length of the upper section of the hopper axially beyond the open lower end 48 of the duct.

As hay is delivered with its accompanying air stream through the opening 30 into the upper section 34 of the hopper and the aforementioned delivery area thereof, the hay and air stream swirl axially downwardly and around the duct 44 in cyclone fashion. As a result, the hay separates from the accompanying air stream, while the latter loses some of its velocity imparted thereto by the rapidly rotating flails or arms of the rotary flail type pick-up mechanism 26 due to the downwardly increasing cross section of the delivery area or annular area defined between the upper section of the hopper and the vent duct. Consequently, the hay continues to swirl axially downwardly along the upper section of the hopper and then along the lower section thereof and travels toward wall portion 40 entering the housing 42, while the accompanying air stream separated therefrom is vented to atmosphere by entering the lower open end 48 of the duct, passing therethrough and emerging exteriorly thereof through the upper open end 46 thereof. As a result of this cyclonic swirling type of separation of the hay from the accompanying air stream and venting of the latter to atmosphere, a build up of back pressures is prevented within the hopper which otherwise may retard delivery of hay to be wafered through the opening 30 therein.

The engine output shaft 20 is connected in any well known manner, as by gearing or the like disposed in housing 50 beneath the housing 42, to a vertically disposed drive shaft 52 which extends through the bottom wall 54 of the housing 42 to the interior of the latter, and is suitably rotatably supported therein by bearing means 56 mounted on the floor member 58 within the housing. A pair of spaced horizontal radially extending arm 60 have their central portions suitably rigidly secured to the drive shaft 52 for rotation therewith within the wafering chamber 62, and have journaled at the opposite ends thereof a pair of rotatable compaction or compression rollers 64 which travel in rotative paths within the wafering chamber 62 immediately below the cylindrical wall portion 40 at the lower end of the lower section 38 of the hopper and just above floor member 58.

A feed auger means is indicated generally at 66 and comprises a hollow hub or shaft 68 having its lower end suitably rigidly secured for drive thereof to the drive shaft 52 or to the upper one of the pair of arms 60 and projects upwardly therefrom substantially coaxially with the drive shaft and the hopper 32, and has mounted on the exterior surface thereof in the usual manner two auger flights 70 having their lower ends terminating immediately in advance of the rotative path of travel of the respective rollers 64. A conical head member 72 is secured at the upper end of the auger hub 68 and is secured to a rotatable shaft 74 supported at its upper end in bearing means 76 carried, by way of example, by a rib member 78 extending radially between opposite sides of the duct 44 at the upper open end of the latter. As will be readily apparent from FIGURE 2, the respective flights 70 of the feed auger taper axially upwardly and inwardly from their lower ends toward their upper ends adjacent the conical head member 72.

It will now be apparent that hay delivered to the hopper 32 and separated from the air accompanying it will swirl axially downwardly as previously described and radially inwardly about the auger hub 68 onto the respective flights 70 of the feed auger means. The tapered configuration of the respective flights of the feed auger means insure that a portion of each flight immediately below an upper portion thereof projects outwardly sufficiently from the latter so as to receive some of the hay so delivered, thereby contributing to optimum uniform distribution of the hay to the feed auger means for supply to the wafering chamber 62.

As the hay is so fed by the feed auger means into the wafering chamber 62, means are preferably provided for applying a desired amount of moisture to such hay prior to compaction or compression thereof by the rollers 64 as will be described hereinafter. In this regard, application of such moisture has been found to be desirable for various reasons including, by way of example, that of facilitating the tendency of the hay fibers to become more pliable, stick together and, in general, set into the desired shape upon completion of the wafering operation. To this end, a water pump 80 is provided on the frame 12 of the apparatus and is adapted to be driven in a suitable manner from the engine 18 to supply water through a conduit 82 connected as by a rotatable sealing member 84 to the upper end of a similar conduit, not shown, mounted for rotation with the shaft 74 interiorly of the latter and connected at its lower end through two individual conduits also not shown disposed interiorly of the auger hub 68 to openings, nozzles or the like 86 immediately adjacent lower portions of each of the respective auger flights 70 in advance of the path of travel of the latter. As a result, a stream or spray of water may be supplied to the lower portion of each of the auger flights as the hay to be wafered passes axially therealong, thereby insuring that the hay receives a suitable amount of moisture for the purposes aforementioned immediately prior to entering the wafering chamber 62.

The wafering chamber, the die cells associated therewith and through which the hay is adapted to be compacted or compressed by the rollers 64 to form extrusions of compacted hay emerging from the exit ends thereof, and the means for breaking wafers from such extrusions and conveying them from the apparatus, reference may be constructed in any one of various known ways, one of which is illustrated in the drawing. Since the details of such construction do not, in and of themselves, form any part of the present invention and are known, a brief description of the nature and operation of these components of the apparatus should suffice for present purposes. For further details of such construction, reference may be made to copending application Serial No. 194,399, filed May 14, 1962, in the names of Merle H. Peterson and Stanley L. Lawrence, entitled "Hay Wafering Method and Apparatus," and assigned to the assignee of this application.

Thus, the wafering chamber 62 includes a pair of vertically spaced parallel annular die wall members 88 having fixedly disposed therebetween an annular or circumferentially spaced series of knife edges 90. An annular or circumferentially spaced series of pairs of side die wall members 92 and 94 are disposed between the die wall members 88, and have their radially inner ends suitably hingedly connected adjacent a radially outward portion of each of the respective fixed knife edges 90 so as to diverge radially outwardly therefrom in a V-shaped configuration. Thus, a series of axially open radially extending die cells are formed between the die wall members 88 and the respective oppositely spaced side die wall members 92 and 94 of an adjacent pair thereof as will be readily apparent to those acquainted with this art, and the axes of such die cells are contained in a common horizontal plane or plane parallel with the ground with the entrance end thereof communicating with the wafering chamber 62. The numeral 96 indicates the conventional hydraulically operated motor assemblies of the type comprising relatively reciprocable piston and cylinder elements interposed between each hinged pair of side die wall members 92 and 94 to control their angular relationship relative to each other and, hence, the extent of convergence of the areas of the die cells between their entrance and exit ends, the respective motor assemblies being supplied in the usual manner through individual conduits 98 connected to a common annular manifold 100 connected to a source of fluid under pressure controlled from the control panel on the control pedestal 22.

As will be readily apparent, the rollers 64 are positioned closely to but do not engage the knife edges 90. Thus, hay fed continuously by the feed auger means 66 from the hopper 32 into the wafering chamber 62 is laid across the knife edges and the entrance ends of the respective die cells in advance of the rotative paths of the rollers 64, which rollers compact or compress the hay and force it past the knife edges and into and through the respective die cells upon successive rotative passes thereof.

A drive sprocket secured to the drive shaft 52 within the housing 42 is connected through a drive chain 102 to a similar sprocket mounted on a vertical shaft suitably rotatably mounted within the housing 42. A gear wheel 104 secured on this shaft engages an annular or circumferentially spaced series of drive pins 106 of an annular conveyor mechanism including a plurality of annularly or circumferentially spaced conveyor paddles 108. The conveyor paddles travel in a continuous path about the exit ends of the die cells and along the bottom wall 54 of the housing 42, and are disposed immediately below the horizontal plane of the die cells. A suitable number of spaced break-off tabs 110 each upstand from respective ones of the conveyor paddles 108 and project into the horizontal plane of the die cells so as to be engageable with a radially outer portion of a given extrusion of hay emerging therefrom. As a break-off tab so engages an extrusion of compacted or compressed hay, the latter is caused to bend and break substantially at the exit end of its associated die cell to form a wafer then drops onto the bottom wall 54 of the housing 42 and is conveyed therealong by the associated conveyor paddle. As will be appreciated, the gear reduction between the drive shaft 52 and the conveyor mechanism aforescribed and, hence, the timing of the latter is such as to permit a predetermined length of extruded hay to overhang from the exit ends of the die cells before being engaged by a break-off tab 110.

The hay wafers which fall upon the bottom wall of the housing 42 are moved therealong as aforedescribed until reaching an opening or the like therein, not shown, communicating with one end of an elevator type conveyor 112 of conventional construction equipped with spaced conveyor paddles 114 which pick up the hay wafers and convey them from the apparatus, preferably into a trailing conveyance.

The embodiments of the invention in which an exclusive property or privilege is claimed are defined as follows:

1. A method of wafering hay comprising the steps of delivering hay to a feed hopper so as to swirl within the latter in an axial path about and axially upon a feed auger therein, feeding the hay from the hopper axially along the feed auger and laying it upon the entrance ends of an annular series of axially open die cells, applying force successively to the hay opposite the entrance ends of the die cells to compact the hay into and therethrough to form extrusions of compacted hay emerging from the exit ends thereof, and breaking the extrusions emerging from the exit ends of the die cells into wafers.

2. A method of wafering hay comprising the steps of delivering hay in an accompanying force air stream to one end of a feed hopper axially spaced from a feed auger therein and so as to swirl in an axial path within said hopper, separating the air stream from the hay within the hopper and venting the air stream from the hopper through said one end thereof, feeding the separated hay from the hopper along the feed auger and laying it upon the entrance ends of an annular series of axially open die cells, applying force successively to say opposite the entrance ends of the die cells to compact the hay into and therethrough to form extrusions of compacted hay emerging from the exit ends thereof, and breaking the extrusions emerging from the exit ends of the die cells into wafers.

3. A method of wafering hay comprising the steps of delivering hay in an accompanying forced air stream to one end of a feed hopper so as to swirl in an axial path radially about and axially upon a feed auger therein, separating the air stream from the hay in the flow path and venting the air stream from the hopper through said one end thereof, feeding the separated hay from the hopper along the feed auger and laying it upon the entrance ends of an annular series of axially open die cells, applying force successively to hay opposite the entrance ends of the die cells to compact the hay into and therethrough to form extrusions of compacted hay emerging from the exit ends thereof, and breaking the extrusions emerging from the exit ends of the die cells into wafers.

4. In an apparatus for making compressed hay wafers, and of the type having an annular series of die cells including entrance ends thereof circumferentially spaced about and communicating with a wafering chamber in which there is mounted a rotary hay compaction means for compacting hay received within said chamber into and through said die cells to form wafers; the improvement comprising a hopper having one end thereof communicating with said chamber, feed auger means mounted within said hopper, and means for delivering hay to be wafered in a swirling flow path in said hopper axially toward and radially about said feed auger means for feed to said chamber.

5. In an apparatus for making compressed hay wafers, and of the type having an annular series of die cells including entrance ends thereof circumferentially spaced about and communicating with a wafering chamber in which there is mounted a rotary hay compaction means for compacting hay received within said chamber into and through said die cells to form wafers; the improvement comprising a hopper having one end thereof communicating with said chamber, axially extending rotatable feed auger means mounted within said hopper and having one end thereof drivingly connected to said rotary hay compaction means for rotation with the latter, and means for delivering hay to be wafered in a swirling flow path in said hopper axially toward and radially about the other end of said feed auger means for feed to said chamber.

6. The apparatus according to claim 5 in which said feed auger means includes a plurality of auger flights tapering axially inwardly from said one end thereof toward said other end thereof.

7. In an apparatus for making compressed hay wafers, and of the type having an annular series of die cells including entrance ends thereof circumferentially spaced about and communicating with a wafering chamber in which there is mounted a rotary hay compaction means for compacting hay received within said chamber into and through said die cells to form wafers; the improvement comprising a hopper having one end thereof communicating with said chamber, feed auger means mounted within said hopper, duct means mounted within said hopper and venting the interior of the latter through the other end thereof, and means for delivering hay to be wafered in an accompanying air stream into said other end of said hopper in an axially swirling flow path around and along said duct to separate the hay from the air stream and vent the latter from said hopper through said duct.

8. The apparatus according to claim 7 in which said means for delivering hay to be wafered in an accompanying air stream includes a delivery opening in said hopper between the latter and said duct.

9. The apparatus according to claim 7 in which said hopper includes a section thereof tapering axially outwardly from and radially spaced about said duct, and wherein said means for delivering hay to be wafered in an accompanying air stream includes a delivery opening in said section of said hopper.

10. In an apparatus for making compressed hay wafers, and of the type having an annular series of die cells including entrance ends thereof circumferentially spaced about and communicating with a wafering chamber in which there is mounted a rotary hay compaction means for compacting hay received within said chamber into and through said die cells to form wafers; the improvement comprising a hopper having one end thereof communicating with said chamber, feed auger means mounted within said hopper, means for delivering hay to be wafered in an accompanying air stream into the other end of said hopper in an axially swirling flow path axially toward and radially about said feed auger means, and means for venting the air stream from the hay and said hopper through said other end of the latter.

11. In an apparatus for making compressed hay wafers, and of the type having an annular series of die cells including entrance ends thereof circumferentially spaced about and communicating with a wafering chamber in which there is mounted a rotary hay compaction means for compacting hay received within said chamber into and through said die cells to form wafers; the improvement comprising a hopper having one end thereof communicating with said chamber, rotatable feed auger means mounted within said hopper and having one end thereof drivingly connected to said rotary hay compaction means for rotation with the latter, duct means mounted within said hopper opposite said feed auger means and venting the interior of the hopper through the other end thereof, and means for delivering hay to be wafered in an accompanying air stream into said other end of said hopper in an axially swirling flow path around and along said duct axially toward said feed auger means to separate the hay from the air stream and vent the latter from said hopper through said duct.

12. In an apparatus for making compressed hay wafers, and of the type having an annular series of die cells including entrance ends thereof circumferentially spaced about and communicating with a wafering chamber in which there is mounted a rotary hay compaction means for compacting hay received within said chamber into and through said die cells to form wafers; the improvement comprising an axially extending hopper having one end thereof communicating with said chamber and the other end thereof spaced therefrom, axially extending rotatable feed auger means mounted within said hopper and having one end thereof drivingly connected to said rotary hay compaction means for rotation with the latter and the other end thereof spaced therefrom, an axially open and extending vent duct mounted on said hopper and extending substantially coaxially and radially inwardly of the latter, one open end of said duct being spaced axially from said other end of said feed auger means interiorly of said hopper and the other open end thereof communicating with the exterior of said hopper at said other end thereof, and means for delivering hay to be wafered in an accompanying air stream into said other end of said hopper between the latter and said duct for movement in an axially swirling flow path therealong toward said other end of said feed auger means to separate the hay from the air stream and vent the latter from said hopper through said duct.

13. The apparatus according to claim 12 in which said feed auger means includes a plurality of auger flights tapering axially inwardly from said one end thereof toward said other end thereof to receive hay separated from the air stream for feed to said chamber.

14. The apparatus according to claim 12 in which said hopper includes an enlarged portion intermediate the ends thereof and between said one open end of said duct and said other end of said feed auger means, said hopper tapering axially outwardly from said one end thereof to said enlarged portion and tapering axially inwardly from the latter toward said other end thereof.

15. The apparatus according to claim 12 in which said hopper includes a section thereof tapering axially outwardly from and radially spaced about said duct, and wherein said means for delivering hay to be wafered in an accompanying air stream includes a delivery opening in said section of said hopper.

16. The apparatus according to claim 12 in which said hopper includes an enlarged portion intermediate the ends thereof and between said one open end of said duct and said other end of said feed auger means, said hopper having a first section tapering axially outwardly from said one end thereof to said enlarged portion thereof and a second section tapering axially inwardly from said enlarged portion toward said other end thereof around said duct, and wherein said means for delivering hay to be wafered in an accompanying air stream includes a delivery opening in said second section of said hopper.

References Cited by the Examiner

UNITED STATES PATENTS

| | | |
|---|---|---|
| 1,238,981 | 9/17 | Barton. |
| 1,484,179 | 2/24 | McClure et al. |
| 2,703,015 | 3/55 | Sykes _____ 55—459 X |
| 2,843,989 | 7/58 | McClellan _____ 56—24 X |
| 3,064,811 | 11/62 | Mumper _____ 55—459 X |
| 3,084,620 | 4/63 | Gibbons _____ 100—71 |

FOREIGN PATENTS

| | | |
|---|---|---|
| 1,250,174 | 11/60 | France. |
| 196,947 | 5/23 | Great Britain. |
| 505,231 | 5/39 | Great Britain. |

OTHER REFERENCES

Western Livestock Journal, April 1961, pages 36 and 39.

Agricultural Engineering, S. 671.A3, August 1961, pages 412–415 and 423.

WALTER A. SCHEEL, *Primary Examiner*.

UNITED STATES PATENT OFFICE
CERTIFICATE OF CORRECTION

Patent No. 3,183,858 May 18, 1965

Stanley L. Lawrence

It is hereby certified that error appears in the above numbered patent requiring correction and that the said Letters Patent should read as corrected below.

Column 1, line 60, for "delivey" read -- delivery --; column 3, line 69, for "opening" read -- open --; column 4, line 41, for "arm" read -- arms --; column 6, line 63, for "force" read -- forced --; same column 6, line 71, for "say" read -- hay --.

Signed and sealed this 5th day of October 1965.

(SEAL)
Attest:

ERNEST W. SWIDER
Attesting Officer

EDWARD J. BRENNER
Commissioner of Patents